June 5, 1951  D. W. WIEGEL  2,555,720
COMBINED COOKER AND STEAMER
Filed Feb. 25, 1949
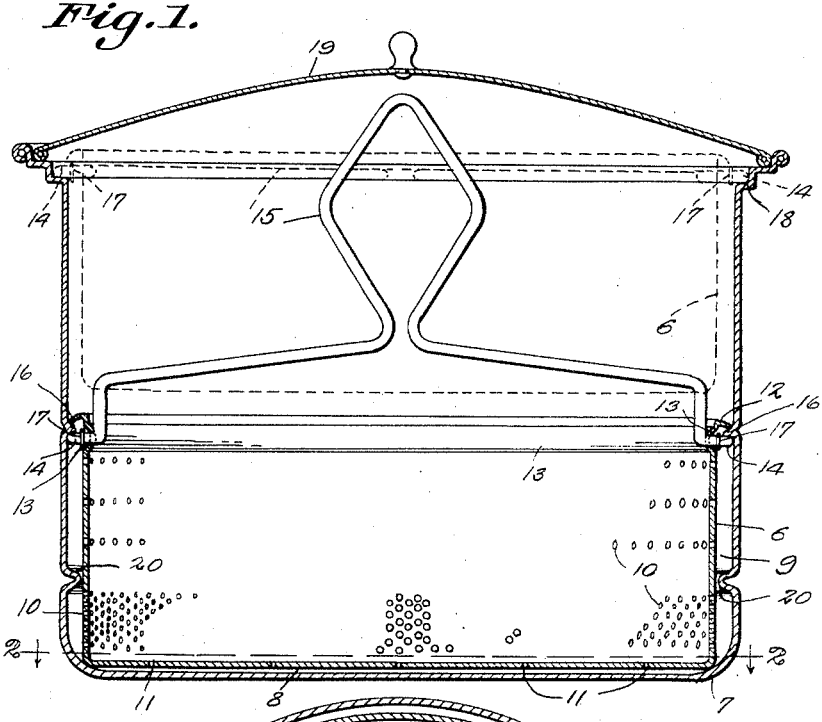
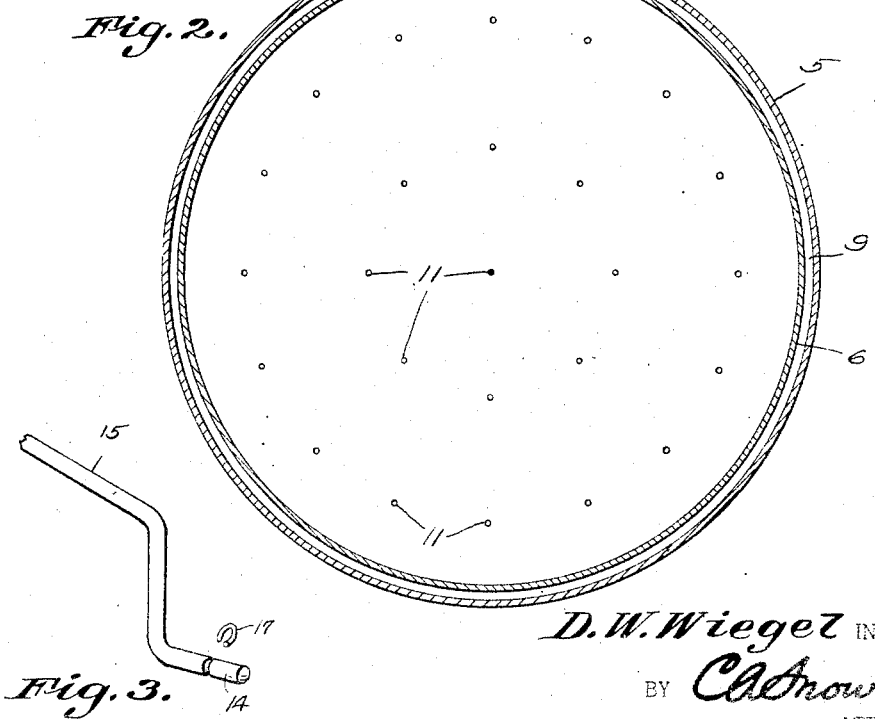
D. W. Wiegel INVENTOR
BY C. A. Snow & Co.
ATTORNEYS.

Patented June 5, 1951

2,555,720

UNITED STATES PATENT OFFICE 2,555,720

COMBINED COOKER AND STEAMER

David W. Wiegel, El Dorado, Ark.

Application February 25, 1949, Serial No. 78,335

4 Claims. (Cl. 99—413)

This invention relates to cooking utensils, and more particularly to a combined cooker and steamer wherein the inner vessel of the utensil may be lowered during the boiling of food therein and then elevated to a position within the outer vessel to a position above the level of the water therein, steaming the food, which is the desirable method employed in cooking and steaming rice.

An important object of the invention is to provide a cooker and steamer of this character wherein the inner vessel when positioned within the outer vessel, will provide a space between the inner and outer vessels to cause a turbulence to be set up through the openings in the wall and bottom of the inner vessel when the water reaches the boiling point, thereby agitating the food being cooked to cause the grains to be separated during cooking, eliminating mushing, which results when foods are cooked in the usual way.

Another object of the invention is to provide means whereby the inner vessel will be secured in its lowermost position during the boiling period, means being also provided for securing the inner vessel in its elevated position, where the water may drain therefrom, and properly supporting the food for the action of the steam.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a vertical sectional view through a cooking vessel constructed in accordance with the invention, the inner vessel being illustrated in its lowermost or cooking position.

Fig. 2 is a sectional view taken on the line 2—2 of Fig. 1.

Fig. 3 is a perspective view illustrating one end of the bail of the inner vessel.

Referring to the drawing in detail, the cooking utensil comprises an outer vessel 5 and an inner vessel 6, the outer vessel being approximately twice as deep as the inner vessel, for purposes to be hereinafter more fully described.

The bottom of the outer vessel is curved where it merges into the side wall of the outer vessel, as indicated at 7, while the bottom of the inner vessel is more or less flat. This structure, as clearly illustrated by Fig. 1 of the drawing, prevents the inner vessel from resting flat on the bottom of the outer vessel, to the end that the space 8 is provided between the bottoms of the inner and outer vessels. The side of the inner vessel is substantially straight and spaced from the wall of the outer vessel providing a substantially wide space 9, between the inner and outer vessels.

The wall and bottom of the inner vessel are provided with openings 10 and 11 respectively, through which water circulates from the spaces 8 and 9, setting up a turbulence which agitates the food being cooked by boiling, to prevent the mushing of the food particularly when food such as rice is being cooked.

The upper edge of the inner vessel is turned outwardly as at 12, so that it closely engages the wall of the outer vessel, as shown by Fig. 1 of the drawing, to retain the water within the spaces 8 and 9.

The inner vessel 6 is formed with an annular groove 13, and this groove is formed with openings through which the ends 14 of the bail 15 extend, the bail 15 providing means whereby the inner vessel may be raised and lowered.

As shown, the ends 14 of the bail 15 are substantially long so that they extend to positions engaging the annular rib 16 formed on the inner surface of the outer vessel, thereby providing means for securing the inner vessel in its lowermost position. The bail 15 is constructed of yieldable wire material and stop rings 17 are secured on the ends 14 to provide stops to limit the inward and outward movement of the ends 14 within the openings of the inner vessel. The natural spring tendency of the bail is to spread the ends 14, with the result that when positioning the inner vessel, the bail is compressed so that the ends 14 will slide over the inner surface of the wall of the outer vessel. When the extremities of the ends 14 reach the annular rib 16 they will expand into engagement therewith securing the inner vessel against upward movement. At the upper end of the outer vessel 5, is the annular shoulder 18 on which the ends 14 of the bail rest, when the inner vessel is moved to its uppermost position to steam the food contained therein.

The bail 15 is so constructed that it may be folded downwardly as shown in dotted lines in Fig. 1 and when the bail is gripped, the portion of the bail intermediate its ends will act as handles to draw the ends 14 of the bail inwardly by compressing the handle. The lid of the vessel is indicated by the reference character 19 and is designed to fit within the outer end of the outer vessel to retain the heat, as shown by Fig. 1 of the drawing.

Spaced from the bottom of the outer vessel, is the annular inwardly extended rib 20 which extends to a point close to the inner receptacle 6 providing a guide in seating the inner vessel 6 and to also provide a space for the water which is close to the burner or flame used in cooking insuring quick generation of steam.

In using the utensil, food such as rice, may be positioned within the inner vessel 6 and when the water within the vessel 6 and bottom of the outer vessel, reaches the boiling point, the water will pass through the spaces 8 and 9, through the openings 10, agitating the food being cooked, so that the particles of food will be separated. After the food has been cooked the desired length of time, the inner vessel may be elevated to the position shown in dotted lines in Fig. 1 of the drawing and the food subjected to the action of steam generated in the lower section of the outer receptacle, whereupon the water drains from the food or grains, the rice being swelled by the steam.

While I have designed the cooker primarily for use in cooking rice or the like, it is to be noted that foods such as peas, beans, spaghetti, carrots, or as a matter of fact any type of vegetable cooked by the boiling method, may be properly cooked with the cooker, retaining the vitamins by partially cooking the vegetables in boiling water, the final stages of cooking being done by steam and out of the water.

The utensil may be effectively used in warming left overs from the refrigerator.

Having thus described the invention, what is claimed is:

1. A cooker embodying an outer vessel formed with a curved portion where the bottom and side of the outer vessel merge, an inner vessel having a wall inclined outwardly towards the upper end thereof, the inner vessel contacting the outer vessel at the curved portion of the bottom of the outer vessel, providing spaces between the side and bottom of the inner and outer vessels through which water circulates agitating food held within the inner vessel, and means for holding the inner vessel submerged in the water of the outer vessel when cooking.

2. A cooker embodying an outer vessel and an inner vessel having a foraminous bottom and side wall, the outer vessel having an annular rib formed in the inner surface thereof at a point intermediate the top and bottom of the outer vessel, holding the inner vessel spaced from the outer vessel, providing a water circulating space, a yieldable bail having right-angled ends extending through openings in the inner vessel, said right angled ends extending under the annular rib, securing the inner vessel within the bottom of the outer vessel, the ends of said bail being retractable, whereby the inner vessel is elevated to a position above the water level within the outer vessel, and the upper edge of the inner vessel being extended outwardly, adapted to engage the upper surface of the annular rib, closing the upper end of the water circulating space.

3. A cooker embodying an outer vessel and an inner vessel having a foraminous bottom and side wall, the side wall and bottom being spaced from the outer vessel providing water circulating spaces through which water passes into the inner vessel, the upper edge of the inner vessel extending outwardly, said inner vessel having an external groove formed adjacent to the upper end thereof, said outer vessel having an internal rib formed intermediate the top and bottom thereof on which the outwardly extended upper edge of the inner vessel rests, a bail having right-angled ends extending through openings in the inner vessel and extending through the groove of the inner vessel, said right-angled ends passing under the internal rib of the outer vessel cooperating with the outwardly extended end of the inner vessel in securing the inner vessel at the bottom of the outer vessel, an annular shoulder formed at the upper end of the outer vessel, and said ends of the bail being movable onto the shoulder when the inner vessel is lifted to the top of the outer vessel, supporting the inner vessel suspended within the outer vessel.

4. A cooker embodying an outer vessel, an inner vessel having a foraminous bottom and side wall, spaced upper and lower annular ribs extending inwardly from the wall of the outer vessel dividing the space between the inner and outer vessels into water spaces through which hot water circulates in cooking food contained within the inner vessel, the upper edge of the inner vessel resting on the upper rib restricting downward movement of the inner vessel within the outer vessel, a bail connected to the inner vessel, the ends of the bail resting against the upper annular rib holding the inner vessel against upward movement, and a cover for the cooker.

DAVID W. WIEGEL.

REFERENCES CITED

The following references are of record in the file of this patent:

UNITED STATES PATENTS

| Number | Name | Date |
|---|---|---|
| 639,474 | Welty | Dec. 19, 1899 |
| 814,714 | Longhenry | Mar. 13, 1906 |
| 2,188,563 | Anzalone | Jan. 30, 1940 |